United States Patent [19]

Szegö et al.

[11] Patent Number: 4,761,423

[45] Date of Patent: Aug. 2, 1988

[54] SEED DRESSING ADDITIVE

[75] Inventors: András Szegö ; József Sós; Ferenc Kováts; István Petróczi; György Kis, all of Budapest; József Karsai, Battonya; Sándor Ángyán, Budapest; István Rácz, Budapest; Katalin Mármarosi, Budapest, all of Hungary

[73] Assignee: Chinoin Gyogyszer es Vegyeszeti Termekek Gyara Rt., Budapest, Hungary

[21] Appl. No.: 796,618

[22] PCT Filed: Jan. 6, 1984

[86] PCT No.: PCT/HU84/00001

§ 371 Date: Oct. 24, 1985

§ 102(e) Date: Oct. 24, 1985

[87] PCT Pub. No.: WO85/02976

PCT Pub. Date: Jul. 18, 1985

[51] Int. Cl.⁴ ............................................. A01N 25/02

[52] U.S. Cl. .................................... 514/395; 47/57.6; 514/425; 514/469; 514/538

[58] Field of Search ...................... 47/57.6; 71/64.07; 514/425, 395, 469, 538

[56] References Cited

U.S. PATENT DOCUMENTS 4,372,080 2/1983 Rushing .............................. 47/57.6

FOREIGN PATENT DOCUMENTS

| 218089 | 1/1985 | German Democratic Rep. |
| 55-141401 | 11/1980 | Japan . |
| 57-007121 | 2/1982 | Japan . |
| 58-088194 | 5/1983 | Japan . |
| 59-182287 | 10/1984 | Japan . |

*Primary Examiner*—Catherine L. Mills
*Attorney, Agent, or Firm*—Herbert Dubno; Jonathan Myers

[57] ABSTRACT

Fungicidal or insecticidal seed dressings characterized by a water content substantially greater than that of the carrier vehicle providing homogeneous coating.

8 Claims, No Drawings

SEED DRESSING ADDITIVE

FIELD OF THE INVENTION

This invention relates to dressing additives, more particularly to seed dressing additives.

The invention is directed to a seed dressing additive which comprises an oil in order to adhere the active ingredient(s) responsible for the desired effect(s) onto the parts of the plant (seeds, tubers etc.) and to form a protecting coating.

BACKGROUND OF THE INVENTION

The success of plant cultivation is endangered by several diseases and pests (e.g. fungal diseases, insects, mammals etc.). The chewing of seeds and seedlings and the diseases of the growing plant result in serious crop damage. The germinating seeds, the tubers and some leafed plants are the most unprotected and any damage might become fatal. Some further diseases caused by the infection of the seed might appear on the crops (e.g. rust and mildew diseases of cereals).

In order to avoid the above mentioned serious damage and to ensure the foodstuff-demands of the population, seed dressing (also referred to as dressing) has been used for a long time. The essential feature of the said process is that the propagative organs of the plant are contacted with chemical substances (referred to furtheron as plant protecting agents or pesticides) which destroy the pests dwelling on the seed or in the vicinity thereof in the soil. The said plant protecting agents provide healthy seeds on the one hand while on the other they kill the soil dwelling sucking-chewing pests. Other known plant protecting agents are adsorbed by the plant and provide protection to the plant for a shorter or longer period of time.

It is an essential feature of the seed dressing procedure that the propagative material and the plant protecting agent should be in contact for a prolonged period of time and the said contact should be maintained when the propagative material enters the soil.

Nowadays in seed dressing technology additives which promote the adhesion of the fungicide and enhance seed dressing are widespreadly used. The users particularly demand additives which posses high adhesive strength, color intensively, dry rapidly and contain no active ingredient because only such additives are suitable for seed dressing wherein the economy in the use of materials is taken into consideration and the rate of application is adapted to the degree of infection.

The known seed dressing methods are as follows:

(1) Wet seed dressing. The pesticide is suspended or—if possible—dissolved in water. The seeds are soaked in this mixture, thereafter filtered and dried. Thus good contact is made between the pesticide and the seeds but the amount of the active pesticidal ingredient which adheres is often lower than that required for the safe protection of the seeds. Further drawbacks are the complicated character of the process, the high labor demand and the costs of drying. For these reasons the said process is not used in practice any more.

(2) Powder dressing. The object of this method is the elimination of the drawbacks of wet technology. The essence of the process is that the active ingredient is ground to a fine powder and a powdered additive is added which promotes adhesion. The process involves, however, serious difficulties. The powder is namely adhered only to the external surface of the propagating material and generally avoids the germ homozygotes. Therefore in the absence of moisture the substance capable of absorption can penetrate the seeds only after sowing under the effect of the humidity of the soil. The adhesion to the dry seeds is weak and therefore the required amount of active ingredient can be applied only with difficulties. Moreover a great part of the pesticide dusts off during treatment, storage and transport of the seeds, consequently it can not exert the desired effect and constitutes health hazards to the handling staff as well.

(3) Moistened seed dressing. From the active ingredient a suspension is prepared with such an amount of water which can be still absorbed by the seeds without increasing the moisture content during storage over the still allowable limit. The object of this method is to maintain the advantages of the wet and dry technologies with the possible strongest suppression of the drawbacks thereof. This object can be reached, however, only by a certain compromise. It is a particularly serious problem that after drying a significant amount of the plant protecting agent dusts off. Water soluble adhesives are used to promote adhesion. These agents are dissolved in water and form colloids but increase the viscosity of the solution to such a large extent that a very thick, dense suspension is formed even if the said adhesive is used in high dilution. If, on the other hand, a small amount of adhesive is used the desired biological effect cannot be achieved because a significant part of the active ingredient and the pesticide dusts off during storage or sowing.

According to the prior art the following attempts have been made to overcome the above drawbacks and difficulties:

(1) Combined pesticides are put on the market which comprise the active ingredients of the seed dressing agent in a pre-determined ratio admixed in a plastic dispersion (e.g. Evershield, Buvishield products). The active ingredient adheres to the seeds by means of a film forming plastic material. The disadvantage of this process is that the composition of the active ingredients is not adapted to the particular infection to be overcome. Thus on the one hand it is necessary to put on the market compositions adapted at least to the most important cultures whilde one the other hand it causes wasteful consumption because a more effective and expansive agent must be used for the treatment of lower infections too. A further drawback is that the germinating strength is reduced and the seeds stick together.

(2) Seed dressing agents have been elaborated which contain no active ingredient. These are solutions of natural (e.g. pine-resin, shellac) or synthetic resins formed with organic solvents (e.g. alcohol). The solutions are admixed with the suspension of the dressing agent and the mixture is applied onto the seeds. After dressing the thus treated seeds the solvent and the excess of water must be removed by drying. The step of drying is to be carried out under constant moving of the seeds in order to avoid the sticking together thereof. This step is carried out by using special equipment.

Such seed dressing methods are disclosed in European patent specification No. 0,010,630 (shellac is used as binding agent), European patent specification No. 0,013,763 (vermiculite and orillanalate are used as coating agent) and Japanese patent application Kokai No. 2,631,032 (a maltotriase polymer is used as coating agent).

DISCLOSURE OF THE INVENTION

The object of the invention is to provide seed dressing agents which eliminate the disadvantages of the known methods.

The present invention is based on the recognition that uniform film coatings with good adhesive strength can be formed on the surface of a wide range of seeds with active ingredients and seed dressing agents the character and amount thereof being variable between broad limits by using a previously prepared emulsion of an oil of vegetable, animal or mineral origin as dressing auxiliary agent.

The thus treated seeds and coatings do not undergo any changes during storage, packing, transport and sowing and there are no dusting losses. The germination strength of the seeds is high and the protection corresponds to the value predicted on the basis of the degree of infection and the character and amount of the pesticide used. The seeds treated with the composition of the present invention do not require special treatment (e.g. drying) since the substances used merely bind the active ingredient to the seed but do not stick the seeds together. The seed dressing does not require a larger amount of moisture than the so-called moistened method referred to above. After the termination of the operation the seed dressed product can be immediately packed and stored. The present invention enables the use of the optimal and most preferable formulation type and is consequently highly economical. Due to its character the auxiliary agent is compatible with the fungicide, insecticide, further additives.

The present invention is based in the recognition that the adhesion of seed dressing agents can be carried out not only with the hitherto known adhesives and auxiliary agents but in the case of seeds having substantially lipophilic (waxy) surface also with oils which coat all parts of the plant. If the oil is applied in the form of fine drops dispersed in water—if necessary in the presence of a dyestuff dissolved in the aqueous phase—the active ingredient applied onto the seeds can completely exert the plant protecting activity without any losses.

The additives of the present invention can be prepared by any known emulsifying method. The composition of the additive is as follows:

| Oil(s) | | 10–80% by weight |
|---|---|---|
| Emulsifier(s) | | 2–7% by weight |
| Water | ad | 100% by weight |
| Dyestuff | | 0–12% by weight |

According to the present invention there is also provided a process for the preparation of the said additives. One may preferably proceed as follows:

The dyestuff component of the aqueous phase is dissolved in water or an aqueous mixture at 35°–40 C.° under slow stirring. The oily layer comprising the dissolved emulsifier is separately prepared. The oily phase is added to the aqueous layer continuously within approximetely 1–10 minutes preferably by using an emulsifying stirrer having a high shear force (peripheral speed: 5–25 m/sec; referred to furtheron as intensive stirring). After the addition of the total amount of the oily phase the emulsion formed is stirred for a further period of 3–5 minutes.

As dyestuff various water-soluble dyestuffs or dispersions thereof can be used (preferably foodstuff-dyes or rodamine colorants).

As emulsifier generally non-ionic alkyl aryl polyglycol ethers and known oil emulsifiers can be used.

The oils may be of vegetable, animal or mineral origin, e.g. paraffin oil, soya oil, sunflower oil, rape oil, fish oil; preferably paraffin oil can be applied.

Eight preferred embodiments of the present invention are summarized in the following Table:

| | | 1 | 2 | 3 | 4 | 5 | 6 | 7 | 8 |
|---|---|---|---|---|---|---|---|---|---|
| Aqueous phase | | | | | | | | | |
| Dyestuffs: | Erdbeerot 109/N | 8 | 10 | 10 | 12 | — | — | — | — |
| in % by weight | Rouge VIF W 3002 | — | — | — | — | — | 10 | — | — |
| | Ostansinbrillantrot H 613 | — | — | — | — | 8 | — | — | — |
| | Rodamin B | — | — | — | — | — | — | 4 | — |
| Water or | Water | 37–40 | 40 | 40 | 38 | 42 | 40 | 33.5–38 | 50 |
| aqueous mixtures | Ethylene glycol | — | 17 | — | — | — | — | 2–5 | — |
| in % by weight | Tensiofix 82.1,2% aqueous solution | 5–2 | — | — | — | — | — | 5–7.5 | — |
| Oily phase | | | | | | | | | |
| Oils, in % | Paraffin oil | 45 | 30 | 45 | — | 45 | 45 | 45 | 45 |
| by weight | Soya oil | — | — | — | 45 | — | — | — | — |
| Emulsifier, | Triton X-45 | 5 | — | 5 | 5 | 5 | 5 | 5 | — |
| in % by weight | Emulsogen M | — | 3 | — | — | — | — | — | 5 |
| | | 100 | 100 | 100 | 100 | 100 | 100 | 100 | 100 |

INDUSTRIAL APPLICABILITY

The advantage of the present invention is that it is generally applicable for a wide range of active ingredients, provides an uniform film-coating having high adhesive strength, enables the use of pesticides duly adapted to the character and degree of infection and disease and is highly economical.

MODES OF CARRYING OUT THE INVENTION

Further details of the present invention are to be found in the Examples without limiting the scope of protection to the said Examples.

EXAMPLE 1

1900 parts by weight of water are weighed in a 3 l flask and 600 parts by weight of Erdbeerrot 109/N dyestuff are dissolved. 2250 parts by weight of paraffin oil are introduced into an other 3 l flask and 250 parts by weight of Triton Y-45 emulsifier are added under intensive stirring. The two solutions prepared above are admixed in a colloidal mill (type Fryma MZ-80 R).

EXAMPLE 2

1900 parts by weight of water are weighed in a 3 l flask and 600 parts by weight of Erdbeerrot 109/N dyestuff are dissolved. 2250 parts by weight of soya oil are introduced into an other 3 l flask whereupon 250 parts by weight of Triton X-45 emulsifier are dissolved under intensive stirring. The above two solutions are admixed in a colloidal mill (type Fryma MZ-80 R).

EXAMPLE 3

2000 parts by weight of water are weighed in a 3 l flask whereupon 500 parts by weight of Rouge VIF W 3002 dyestuff are dissolved. 2250 parts by weight of paraffin oil are introduced into an other 3 l flask and 250 parts by weight of Triton X-45 emulsifier are added to the oil under intensive stirring. The above two solutions are admixed in a colloidal mill (Fryma MZ-80R).

EXAMPLE 4

1717.5 parts by weight of water (temperature 40 C.°) are weighed in a 3 l flask whereupon 32.5 parts by weight of Rhodamin BSA extra 1150 dyestuff are dissolved. 2925 parts by weight of paraffin oil are introduced into a 5 l flask and 325 parts by weight of Triton X-45 emulsifier are added under intensive stirring. The above two solutions are admixed in a colloidal mill (type Fryma MZ-80 R); the solutions are introduced into the mill in the order of succession of their preparation.

EXAMPLE 5

Into a 3 l flask 2222.5 parts by weight of water are weighed in whereupon 27.5 parts by weight of a liquid Rhodamin 2BU dyestuff are dissolved. Into a 5 l flask 2475 parts by weight of paraffin oil are introduced and 275 parts by weight of Triton X-45 are added under intensive stirring. The above two solutions are admixed in a colloidal mill (type Fryma MZ-80 R).

EXAMPLE 6

Into a 3 l flask 2461.5 parts by weight of water (50 C.°) are introduced and 38.5 parts by weight of liquid Rhodamin 2 BU dyestuff are dissolved. Into an other 3 l flask 2200 parts by weight of 50 C.° paraffin oil are weighed in and 300 parts by weight of Product VM 20 emulsifier pre-heated to 60 C.° are added under intensive stirring. The above two solutions are admixed in a colloidal mill (type Fryma MZ-80 R) in the order of succession of their preparation.

EXAMPLE 7

Into a 3 l flask 1835 parts by weight of water are introduced and 50 parts by weight of liquid Rhodamin 2 BU dyestuff are dissolved. Into a 5 l flask 2925 parts by weight of paraffin oil are introduced and 325 parts by weight of Triton X-45 emulsifier are added under intensive stirring. The above two solutions are introduced into a colloidal mill (type Fryma MZ-80 R) in the order of succession of their preparation and admixed.

EXAMPLE 8

1390 part by weight of water are weighed in a 3 l flask and 110 parts by weight of liquid Rhodamin 2 BU dyestuff are dissolved. Into a 5 l flask 3150 parts by weight of paraffin oil are introduced and 350 parts by weight of Emulsogen M emulsifier are added under intensive stirring. The above two solutions are admixed in a colloidal mill (type Fryma MZ-80 R).

(1) Dyestuffs

Erdbeerot 109/N 52% by weight of neucoccine (Les Colorants Wackherr)
Rouge VIF W 3002 (56% by weight of neucoccine) (Les Colorants Wackherr)
Ostansinbrillantrot H 613 (food-dyestuff) Czechoslovakia
Rhodamin B (70% tetraethyl rhodamine) Poland
Rhodamin 2BU liquid (about 60% by weight of rhodamine derivatives) BASF
Rhodamine BSA extr. 1150 (100% by weight of tetraethyl rhodamine Ugine Kuhlmann

(2) Emulsifier

Triton X-45 (coctyl phenol-polyethoxy-ethanol) Rohm and Haas
Emulsogen M (fatty alcohol polyglycol ether) Hoechst
Product VM 20 (fatty acid polyglycol ester)

(3) Pesticides

Orthocid 50 WP (50% by weight of Captan): chemical name of active ingredient: 1.2.3.6-tetrahydro-N-(trichloro-methylthio)-phthalimide Chevron-BVM
Apron 35 SD (35% by weight of Metalaxyl): chemical name of active ingredient: methyl-N-(2-methoxyacetyl)-N-(2.6-xylyl)-DL-alaninate Ciba-Geigy

EXAMPLE 9

In a round-bottomed flask 100 g of winter wheat are subjected to seed dressing with the composition according to Example 1 and fungicidal and insecticidal plant protecting agents and the germination strength of the thus treated seeds is determined.

Control: non-treated winter wheat 94%.

| Additive according to the present invention | Treatment dosage Plant protecting agent | Water | Germination % |
|---|---|---|---|
| 3 l/t | — | 25 l/t | 97 |
| 6 l/t | — | 25 l/t | 95 |
| 3 l/t | 40% carbofuran suspension (FW) 4 l/t | 25 l/t | 95 |
| 6 l/t | 40% carbofuran suspension (FW) 8 l/t | 25 l/t | 94 |
| 3 l/t | 25% carbendazim suspension (FW) 2 l/t | 25 l/t | 95 |
| 3 l/t | 50% benomyl wettable powder (WP) 2 kg/t | 25 l/t | 93 |

EXAMPLE 10

In a round-bottomed flask 100 g of winter wheat are subjected to seed dressing with the composition according to Example 2 and fungicidal or insecticidal plant protecting agents. The germination strength of the thus treated seeds is determined.

Control: untreated winter wheat: 94%.

| Additive according to the present invention | Treatment dosage Plant protecting agent | Water | Germination, % |
|---|---|---|---|
| 3 l/t | — | 25 l/t | 95 |
| 6 l/t | — | 25 l/t | 96 |

-continued

| Additive according to the present invention | Plant protecting agent | Water | Germination, % |
|---|---|---|---|
| 3 l/t | 40% carbofuran suspension 4 l/t | 25 l/t | 96 |
| 6 l/t | 40% carbofuran suspension 8 l/t | 25 l/t | 94 |
| 3 l/t | 25% carbendazim suspension 2 l/t | 25 l/t | 95 |
| 3 l/t | 50% benomyl wettable powder 2 kg/t | 25 l/t | 98 |

EXAMPLE 11

The germination data of bean subjected to seed dressing with the composition according to Example 3 are as follows:

| Additive according to the present invention | Water | Germination % |
|---|---|---|
| Control | — | 94 |
| 3 l/t | 15 l/t | 96 |
| 3 l/t | 5 l/t | 97 |
| 3 l/t | — | 96 |

EXAMPLE 12

On a MIST-O-MATIK type machine the following seeds are subjected to seed dressing with the composition according to Example 3.
Batch size: 100 kg of seeds.

| Seed | Treatment | Germination, % before treatment | Germination, % after treatment |
|---|---|---|---|
| Muscat melon | Additive of the invention 4 l/t Water 5.6 l/t | 96 | 97 |
| Marrowfat pea | Additive of the invention 6 l/t Water 1.6 l/t 50% by weight of captan seed dressing agent 1.8 kg/t | 88 | 93 |
| Carrot | Additive of the invention 15 l/t Water 9.9 l/t 50% by weight of captan seed dressing agent 5.1 kg/t | 81 | 83 |

EXAMPLE 13

Babarocon Maxidor bean (*Phasseolus vulgaris*) is subjected to seed dressing with the composition according to Example 3 against diseases occurring in the germination period.
Amount of seeds: 150 kg/ha
Sowing: on the May 18, 1981
Depth of sowing 5–6 cm
Row and root distance: 45×3 cm
S Plot size: 10×1000 m
Number of replicates: 2
Method of seed dressing: wet seed dressing with 6 l/t of water time: the Apr. 16, 1981
Time of evaluations: May 21, June 8 and July 6, 1981.
The results are summarized in the following Table:

| Treatment | Dosage kg/agent/t seeds | Infection of seeds, % Fusarium | Infection of seeds, % Colletotrichum lindemuthianum |
|---|---|---|---|
| Orthocid 50 WP + additive | 2.0 3.0 | 3 | 5 |
| Orthocid 50 WP | 3.0 | 4 | 10 |
| Untreated control | — | 9 | 27 |

It appears from the above data that as a result of the use of the additive of the present invention the dose of Orthocid 50 WP (wettable powder comprising 50% by weight of Captan) can be decreased by 1 kg/t and no phytotoxical symptoms are observed.

EXAMPLE 14

In the district of Jajhalom (state farm Szerencs) bean of the Oxy Amidor species (*Phaseolus vulgaris*) is subjected to seed dressing with the composition according to Example 3 against diseases of the germination period.
Amount of seeds: 166 kg/ha
Time of sowing: May 12, 1981
Depth of sowing: 4–5 cm
Row and root distance: 45×3–4 cm
Plot size: 2
Method of seed dressing: wet seed dressing with 7.0 l of water/t
time: May 11, 1981
Evaluation: in laboratory: May 21, 1981
  field experiments: May 22, and June 10, 1981, in the, cotyledonary phenophase of the bean at a height of 5–10 cm, with a row distance of 10×2 m per plot Laboratory results:

| Treatments | Dose kg/t | Number of infected seeds No[1] Fusarium[2] spp. | Botrytis[3] spp. | Penicillium[3] spp. | Bacteria[3] |
|---|---|---|---|---|---|
| Orthocid 50 WP + additive | 2.0 3.0 | 1 | 4 | — | 3 |
| Orthocid 50 WP (standard) | 3.0 | 2 | 4 | — | 6 |
| Untreated | — | 7 | 4 | 3 | 7 |

[1]on the basis of 200 seeds per treatment
[2]in a Papavize type medium
[3]after incubation in a wet cell.

Field results

| Treatments | Dose kg/t | Infection, % Fusarium spp. | Botrytis ssp. | Penicillium | Bacterium |
|---|---|---|---|---|---|
| Orthocid 50 WP + additive | 2.0 3.0 | 0.5 | 2.0 | — | 1.5 |
| Orthocid 50 WP (standard) | 3.0 | 1.0 | 2.0 | — | 3.0 |
| Untreated | — | 3.5 | 2.0 | 1.5 | 3.5 |

No phytotoxical symptoms are observed. When treatment is carried out with the composition of the present invention a stable, durable, uniform coating is formed on the surface of the seeds which does not cause environmental pollution. Thus the amount of the plant protecting agent can be reduced by 1 kg/to.

EXAMPLE 15

In the state farm of Dány hybride sorghum of the NK-101 species (*Sorghum vulgare* var. *Saccharatum*) is subjected to seed dressing with the composition according to Example 3 against diseases occuring in the germination period.

Amount of seeds: 15 kg/ha
Time of sowing: May 19, 1981
Depth of sowing: 4 cm
Row distance: 50 cm
Plot size: 0.6 ha
Number of replicates: 2
Method of seed dressing: wet seed dressing with 10 l of water/t
Time of seed dressing: May 14, 1981
Evaluation: June 12 and 23, 1981, in two-leaf stage of the sorghum and subsequently at a height of 15–20 cm the number of the shot plants is counted on an area of 10×20 m on each plot.

| Treatment | Dose kg/t | Plant No/m | | | | | |
|---|---|---|---|---|---|---|---|
| | | 12.06.81 | | | 23.06.81 | | |
| | | I. | II. repetition | average | I. | II. repetition | average |
| Orthocid 50 WP + additive | 2 3 | 8.49 | 9.58 | 9.03 | 10.63 | 10.30 | 10.46 |
| Orthocid 50 WP (standard) | 2 | 8.05 | 8.10 | 8.07 | 10.20 | 10.53 | 10.36 |
| Dithane M45 (standard) | 2 | 7.53 | 9.31 | 8.42 | 9.48 | 9.45 | 9.46 |
| Control | — | 7.00 | 5.94 | 6.47 | 7.24 | 7.33 | 7.28 |

No phytotoxical symptoms are observed. The number of the shot plants is the highest when seeds coated with the composition of the present invention are used.

EXAMPLE 16

In the state farm of Szabadszentkirály pea of species "Csoda" (*Pisum sativum*) is subjected to seed dressing with the composition according to Example 3 against diseases occurring in the germinating period.

Amount of seeds: 300 kg/ha
Time of sowing: Apr. 7, 1981
Depth of sowing: 6–7 cm
Plot size: 0.65 ha (1625×4 m)
Method of seed dressing: wet seed dressing with 9 l of water/t.
Evaluation:
  Apr. 21, 1981—seeds
  May 12, 1981,—complete shooting, cotyledonary stage
  May 29, 1981—plant height of 15–20 cm.

| Treatment | Dose kg/t | Infection of seeds | | Root number | | | |
|---|---|---|---|---|---|---|---|
| | | Fusarium spp. | Ascochyta spp. | 12th May | | 29th May | |
| | | | | No./m. | control % | No./m. | control % |
| Additive + Orthocid 50 WP | 3.0 2.0 | 2 | 2 | 8.75 | 88.65 | 16.5 | 206.25 |
| Orthocid 50 WP | 3.0 | 6 | 9 | 11.0 | 111.45 | 12.5 | 156.25 |
| Untreated control | — | 7 | 9 | 9.87 | 100 | 8.0 | 100 |

No phytotoxical symptoms are observed.

In the treatment carried out with the additive of the present invention+Orthocid 50 WP the stem (root) number is higher by 50% and 106.25% than that of standard treatment obtained with Orthocid 50 WP and the control, respectively.

The detectable Fusarium spp. (2.0) and Ascochyta sp. (2.0) infection of the dressed seeds is significantly lower than that of the standard (6.0 and 9.0% respectively) or the untreated control (7.0 and 9.0, respectively).

EXAMPLE 17

In the farmer's agricultural co-operative of Kerecsend pea of the Allround species (*Pisum sativum*) is subjected to seed dressing with the composition according to Example 3.

Amount of seeds: 300 kg/ha
Time of sowing: Mar. 27, 1981
Time of shooting: Apr. 6–10, 1981
Plot size: 0.3 ha
Number of replicates: 2
Method of seed dressing: wet seed dressing with 7.0 l of water/t
Time of seed dressing: Mar. 20, 1981
Laboratory test is carried out by germinating twice 100 seeds each.

| Composition | Dose kg/t | Laboratory test | | | | | Germination % |
|---|---|---|---|---|---|---|---|
| | | Fusarium spp. | Aspergillus spp. | Penicillium spp. | Rhizopus spp. | Bacterial infection | |
| Seed dressing additive + Orthocid 50 WP | — 3.0 2.0 | 0.0 | 0.0 | 0.0 | 0.0 | 1.5 | 95.5 |
| Orthocid 50 WP | 3.0 | 0.0 | 1.5 | 0.0 | 0.5 | 2.0 | 94.0 |
| Untreated | — | 1.5 | 5.5 | 14.5 | 1.5 | 1.5 | 93.0 |

[1] =on the basis of tests carried out twice with 100 seeds each.

EXAMPLE 18

In the farmer's agricultural co-operative of Szabadszentkirály pea of the "Kelvedon Wonder" species is subjected to seed dressing with the additive according to Example 3 against diseases occurring in the germination period.

Amount of seeds: 300 kg/ha
Time of sowing: Apr. 7, 1981
Depth of sowing: 6–7 cm
Plot size: 0.65 ha (1625×4 m)
Method of seed dressing: wet seed dressing carried out with 7.0 l of water/t
Time of seed dressing: April 3.
Time of evaluation:
  April 21—seeds
  May 12—cotyledonary stage
  May 24—at plant height of 15–20 cm

| Treatment | Dose kg/t | Infection of seeds, % | | Root number | | | |
| | | | | 12th May | | 29th May | |
| | | Fusarium spp. | Ascochyta spp. | No./m. | control % | No./m. | control % |
| --- | --- | --- | --- | --- | --- | --- | --- |
| Apron 35 SD + additive | 2.0 + 3.0 | 2.0 | 5.0 | 12.5 | 126.64 | 13.5 | 168.75 |
| Orthocid 50 WP (standard) | 3.0 | 6.0 | 9.0 | 11.0 | 111.45 | 12.5 | 156.25 |
| Untreated control | — | 7.0 | 9.0 | 9.87 | 100 | 8.0 | 100.0 |

No phytotoxical symptoms are observed.

As a result of seed dressing carried out with Apron-+additive the root number becomes significantly higher than that of the control (68.75%). Simultaneously the growth of fungi on the surface of the seeds is strongly decreased. On seeds treated with the composition of the present invention Fusarium spp. fungi is grown at a rate of 2.0% while on the untreated control at 7%.

What we claim is:

1. In a method of formulating a dressing which is applied to winter wheat, bean, pea or sorghum seed to protect the seed from insect or fungal damage, and wherein the seed dressing vehicle comprises:
(1) 30 to 45% by weight of an oil of vegetable, animal or mineral origin;
(2) 2 to 7% by weight of an emulsifier;
(3) 0 to 12% by weight of a dyestuff; and
(4) 33.5 to 50% by weight water, the improvement which comprises the step of:
dispersing a quantity of the seed dressing vehicle in an amount of water greater than the quantity of the seed dressing vehicle, and adding a fungicide or insecticide to form a seed dressing whose water content is substantially greater than the water content of the seed dressing vehicle.

2. The improvement defined in claim 1 wherein the oil of vegetable origin is soya oil.

3. The improvement defined in claim 1 wherein the oil of animal origin is fish oil.

4. The improvement defined in claim 1 wherein the oil of mineral origin is paraffin oil.

5. The improvement defined in claim 1 wherein the insecticide is carbofuran.

6. The improvement defined in claim 1 wherein the fungicide is carbendazim, benomyl, captan or metaloxyl.

7. The improvement defined in claim 1 wherein the fungicide is benomyl.

8. The improvement defined in claim 1 wherein the fungicide is captan.

* * * * *